United States Patent
Ueda et al.

(10) Patent No.: US 8,371,701 B2
(45) Date of Patent: Feb. 12, 2013

(54) DISCHARGE LAMP LIGHTING DEVICE AND PROJECTOR WITH POLARITY INVERSION CONTROL OF A DISCHARGE LAMP

(75) Inventors: Akira Ueda, Osaka (JP); Kentaro Kato, Kyoto (JP); Takaaki Gyoten, Hyogo (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/697,670

(22) Filed: Feb. 1, 2010

(65) Prior Publication Data

US 2010/0195062 A1     Aug. 5, 2010

(30) Foreign Application Priority Data

Feb. 2, 2009   (JP) ................. 2009-021168

(51) Int. Cl.
*G03B 21/14* (2006.01)
(52) U.S. Cl. ....................................... 353/84
(58) Field of Classification Search .................. 353/84, 353/85; 315/209 R
See application file for complete search history.

(56) References Cited

U.S. PATENT DOCUMENTS

2008/0137041 A1    6/2008   Okamoto et al.

FOREIGN PATENT DOCUMENTS

| CN | 101198204 A | 6/2008 |
| JP | 2007242421 A * | 9/2007 |
| JP | 2008-146837 A | 6/2008 |
| WO | WO 2007/050539 A2 | 5/2007 |
| WO | WO 2007/081036 A1 | 7/2007 |

* cited by examiner

*Primary Examiner* — Thanh Luu
*Assistant Examiner* — Renee Naphas
(74) *Attorney, Agent, or Firm* — RatnerPrestia

(57) ABSTRACT

The polarity of a voltage applied to the electrode pair is inverted by a changing signal generated at every boundary area of each filter color of the color wheel, and also in the blue color region (B) (a, b. c). Herewith, time during which the lamp electrode is positive and that negative is equal to each other every time the color wheel makes two rotations (T), thereby maintaining the heat load to be evenly distributed between both of the electrodes.

8 Claims, 3 Drawing Sheets

Change at the beginning of B

Change at the end of B

DISCHARGE LAMP LIGHTING DEVICE AND PROJECTOR WITH POLARITY INVERSION CONTROL OF A DISCHARGE LAMP

TECHNICAL FIELD

The present invention relates to a discharge lamp lighting device for lighting a high-luminance discharge lamp used in a projector and to a projector including the discharge lamp lighting device.

BACKGROUND ART

There are two types of projection-type image display devices (also described as a projector hereinafter). One is a liquid crystal projector that provides a projection image through transmitted light from a liquid crystal display element. The other is a DLP (Digital Light Processing, registered trademark) projector that provides a projection image through reflected light from a reflective mirror device element such as a DMD (digital micro-mirror device) element. A projector of either type decomposes white light from a white-light source into the three primary colors (red: R, green: G, blue: B) with an optical device such as a prism; illuminates a display element corresponding to each color with each light; and modulates the illuminated light with a video signal to produce a projection image. Particularly, DLP projectors are usually used for business use such as in a conference hall and theater where high luminance and high reliability are demanded. For a white-light source used for a projector, a discharge lamp with high luminance is often used such as a high-pressure mercury lamp and xenon lamp.

In a DLP projector, three-primary lights are illuminated on DMD elements corresponding to each pixel of a projection image; output light to the projection lens is controlled according to changes of the deflection angle to provide a projection image.

A type of DLP projector incorporates three pieces of independent DMD elements each corresponding to three-primary lights (R, G, B); however, the type is complicated while producing high image quality, and is expensive due to the high price of DMD elements. Under the circumstances, a method has become widely used for low-cost projectors that illuminate DMD elements with three-primary lights sequentially and time-divisionally.

To produce three primary colors, a disc (called a color wheel) on which flat surface three pieces of optical filters (segment) each transmitting each of three primary colors are arranged is rotated orthogonally to the light axis of a discharge lamp (as a white-light source) to produce three primary colors sequentially and time-divisionally from white light of a discharge lamp. To increase the luminance of a projection image, a color wheel with 4-color segments including a white filter can be used.

If a discharge lamp is driven by DC power, electrons collide with the positive electrode in arc discharge, thereby increasing its temperature higher than the negative electrode, which consequently shortens the life of the lamp. Hence, the electrode pair is applied with AC power of a predetermined frequency to drive the lamp in a periodically alternating manner between the positive and negative electrodes.

The color wheel is synchronized with the cycle (e.g. $\frac{1}{60}$ second in NTSC method) of one-frame image and is rotationally controlled at the same cycle or one over an integer of the cycle.

The aforementioned alternating cycle of a discharge lamp is desirably less than $\frac{1}{100}$ second because alternating polarity causes discontinuity of luminance, thereby deteriorating the image quality due to flicker or other phenomena. Meanwhile, when polarity changes in a segment region of the color wheel, an instantaneous interruption, overshoot, ringing, or other phenomena of lighting may occur to deteriorate the image quality. Accordingly, control is exercised changing the polarity at a boundary between each segment of the color wheel.

FIG. 2 schematically shows a configuration of a typical color wheel with four colors. As shown in FIG. 2, the center angles (area size) of the 4-color, fan-shaped segments are not equal to each other. In the example of FIG. 2, each angle of G (green), W (white), and B (blue) segments is equal to the other while the angle of R (red) segment is set wide. In other words, the color wheel is structured so that the ratio of light amount transmitting through the color wheel when the color wheel makes one rotation varies between R, G, B, and W. The ratio is determined in consideration of the spectrum distribution of emission energy from the discharge lamp, the color sensitivity of the human eye, and others. The ratio naturally varies also depending on a light source used.

In such a 4-color (even-numbered colors) color wheel, the polarity of the discharge lamp always remains unchanged (the voltage remains positive, for instance) in the period of R (red) with a large angle of the segment in FIG. 2 for instance, when the polarity of the discharge lamp is changed at a boundary between segments. Hence, energy concentrates at one side of the electrode pair to promote deterioration of the discharge lamp. Meanwhile, in a 3-color (odd-numbered colors) color wheel (not shown), the polarity of the discharge lamp is inverted every time the color wheel makes one rotation. Hence, such a problem does not occur even if the ratio of light amount transmitting through the color wheel varies between R, G, and B.

As a method of placing equal burdens without concentrating energy on one electrode, a method shown by patent literature 1 has been devised, for instance. In the method of patent literature 1, changing the polarity inversion is periodically omitted odd number of times in a method of changing the polarity of a discharge lamp at a boundary between the 4-color (even-numbered colors) segments of a color wheel.

This method is described in the example of FIG. 2 for instance. That is, if the polarity of the electrodes is not changed at the boundary between the W and B segments, the polarity of the R segment inverts from the previous polarity, thereby appropriating imbalance in polarity.

The method of patent literature 1, however, omits changing the polarity inversion intermittently to appropriate imbalance in discharge polarity, which may cause the quality of a projection image to deteriorate due to a phenomenon such as flicker involved in polarity inversion depending on the cycle and period of omitting the changing action.

[Prior Art Document]
[Patent Literature]
[Patent literature 1] Japanese Patent Unexamined Publication No. 2008-146837

SUMMARY OF THE INVENTION

A discharge lamp lighting device of the present invention is for a projector generating a projection image by using a color wheel having even-numbered color segments rotating in an optical path of white light emitted from the discharge lamp to produce transmitted light of the even-number colors in a time-divided manner and to illuminate an image display element with the transmitted light. The discharge lamp lighting device includes a polarity inversion signal generating unit generating a polarity inversion signal changing the polarity of a voltage applied to the discharge lamp; and a lamp polarity changing unit changing the polarity of a voltage applied to the discharge lamp on the basis of a polarity inversion signal. The polarity inversion signal generating unit is characterized in that it generates a polarity inversion signal at a boundary between each even-numbered color segment and generates an additional polarity inversion signal also in a segment region corresponding to at least one specific color out of the even-number colors.

Herewith, the periods of positive and negative voltages applied to the electrodes of the discharge lamp become the same every time the color wheel makes two rotations, which prevents heat energy from unevenly distributed at one side of the electrode pair, thereby restraining the life of the discharge lamp from being reduced.

A projector of the present invention generates a projection image by using a color wheel having even-numbered color segments rotating in an optical path of white light emitted from the discharge lamp to produce transmitted light of the even-number colors in a time-divided manner and to illuminate an image display element with the transmitted light. The projector is characterized in that it includes the above-described discharge lamp lighting device.

DETAILED DESCRIPTION OF PREFERRED EMBODIMENT

Hereinafter, a detailed description is made of an embodiment of the present invention with reference to the related drawings.

Exemplary Embodiment

Figure 1:
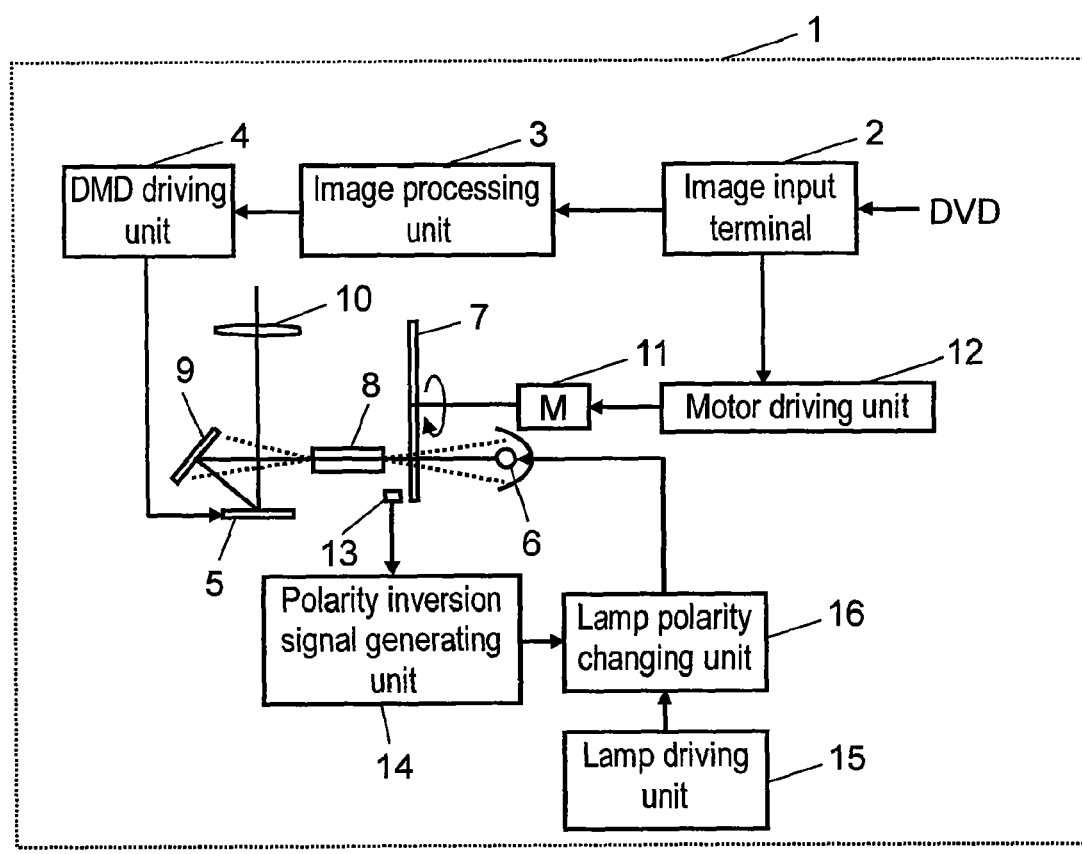
FIG. 1 is a block diagram showing configurations of a discharge lamp lighting device and a projector according to the embodiment of the present invention.

FIG. 1 is a block diagram showing configurations of a discharge lamp lighting device and a projector according to the embodiment of the present invention.

Projector 1 includes image processing unit 3 executing image processing such as IP (interlace-progressive) conversion for driving DMD element 5 for a video signal (e.g. a reproduced image of a DVD) having been input to image input terminal 2, resize, frame rate conversion, and gamma correction; DMD driving unit 4 for driving DMD element 5 with an output image signal from image processing unit 3; discharge lamp 6; color wheel 7; rod integrator 8 for uniformizing luminance distribution; mirror 9; projection lens 10; motor 11 for rotating color wheel 7; motor driving unit 12 for synchronizing rotation of color wheel 7 with a video signal; position sensor 13 for detecting the position of a segment of color wheel 7; polarity inversion signal generating unit 14 for generating a signal for inverting the polarity of a voltage applied to discharge lamp 6 on the basis of a sensing signal from position sensor 13; lamp driving unit 15 for applying a voltage required for discharge lamp 6; and lamp polarity changing unit 16 for inverting the polarity of a voltage applied to the discharge lamp responding to a signal from polarity inversion signal generating unit 14.

High-luminance white light generated by lighting discharge lamp 6 transmits through color wheel 7 and is dispersed into three primary colors and white light in a time-divided manner, and the luminance distribution is uniformized by rod integrator 8. Further, the white light is illuminated on mirror 9 at an appropriate projection angle and deflected, and then illuminated on DMD element 5. The reflected light is magnified by projection lens 10 and projected on a screen (not shown) as an image.

Figure 3A:
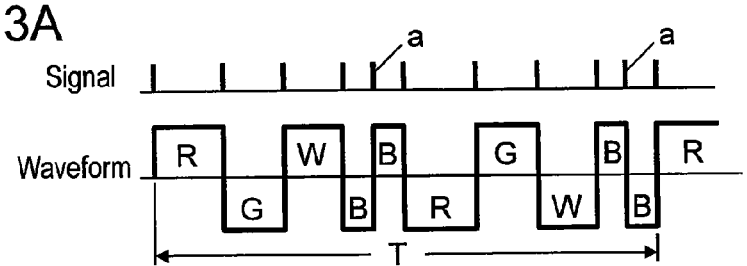
FIG. 3A is a waveform chart of the discharge lamp showing an example of operation of the discharge lamp lighting device according to the embodiment of the present invention.
Figure 3B:
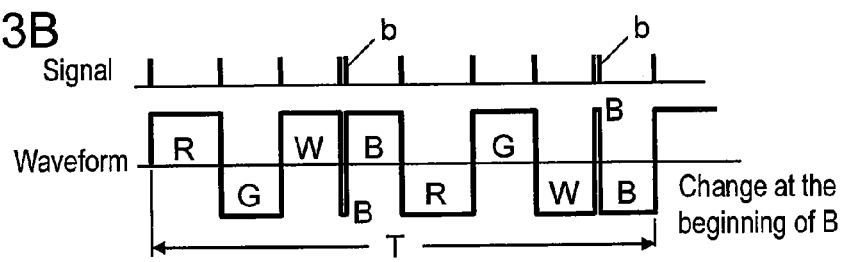
FIG. 3B is a waveform chart of the discharge lamp showing another example of operation of the discharge lamp lighting device according to the embodiment of the present invention.
Figure 3C:
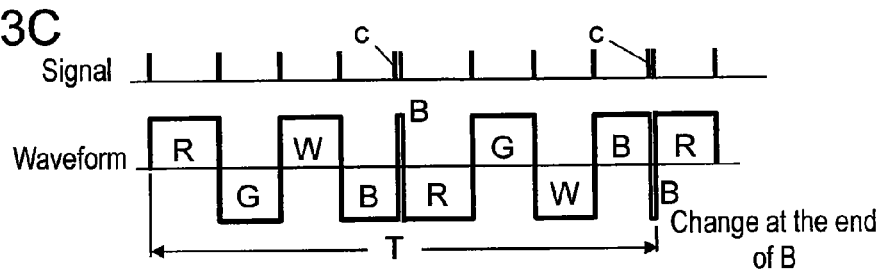
FIG. 3C is a waveform chart of the discharge lamp showing yet another example of operation of the discharge lamp lighting device according to the embodiment of the present invention.

FIGS. 3A through 3C are waveform charts of discharge lamp 6 showing operation of the discharge lamp lighting device according to the embodiment. Here, the discharge lamp lighting device includes discharge lamp 6, position sensor 13, polarity inversion signal generating unit 14, lamp driving unit 15, and lamp polarity changing unit 16 in FIG. 1.

Figure 2:
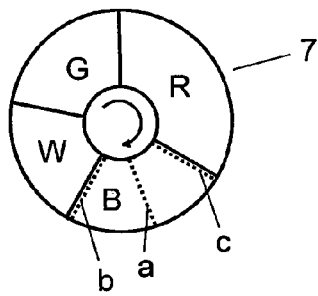
FIG. 2 schematically shows a configuration of a typical color wheel.

FIGS. 3A through 3C respectively show relationship between an inversion signal (the upper part of the drawing) generated by polarity inversion signal generating unit 14 and the waveform (the lower part of the drawing) of a current running through discharge lamp 6. Here, the waveform chart at the lower part shows a waveform along with positions relative to filters R (red), G (green), W (white), and B (blue) of color wheel 7 shown in FIG. 2.

First, a description is made of FIG. 3A. A signal (inversion signal) is generated for each boundary between 4-color segments and also at the intermediate point of segment B (blue). Accordingly, the waveform of a voltage applied to discharge lamp 6 is as the lower part.

As is clear from FIG. 3A, for the first segment R for instance, the polarity is inverted at the next segment R. The situation is the same for segments of the other colors. In other words, the polarity is inverted in each 4-color segment between the first half and the last (the first rotation and the second) of time T during which color wheel 7 makes two rotations, and thus accumulated time during which a positive voltage is applied to the discharge lamp is equal to that of a negative one. The situation is the same even if the ratio of light amount transmitting through color wheel 7 is different between R, G, and B.

Next FIG. 3B shows a case where the position of inversion signal a in FIG. 3A is changed to that of signal b, namely a position close to the segment region W (close to the beginning of segment B). Similarly, next FIG. 3C shows a case where the position of inversion signal a is changed to that of signal c, namely a position close to the segment region R (close to the end of segment B).

As is clear from FIGS. 3B, 3C, the polarity is inverted in each segment between the first rotation and the second one of color wheel 7 similarly to FIG. 3A in any case, and thus accumulated time during which a positive voltage is applied to discharge lamp 6 is equal to that of a negative one.

In this way, as a result that the polarity of discharge lamp 6 is inverted in the segment of a specific color every time color wheel 7 with four colors (even-number colors) makes one rotation, accumulated time during which a positive voltage is applied to discharge lamp 6 can be made equal to that of a negative one. This situation holds even if each center angle ratio (area ratio) of the four segments is different from the other.

As shown in FIGS. 3B, 3C, the time point when the polarity is inverted for one rotation is set to a position close to the beginning or end of segment B of color wheel 7 in this embodiment. As described above, when the polarity of discharge lamp 6 is inverted, deterioration of image quality such as overshoot and ringing may occur in a projection image depending on its time point. Blue color (B) generally exhibits lower human-eye sensitivity (what is called visibility) than the other colors. Hence, even when polarity inversion is executed in segment B, deterioration of image quality in a projection image is less visible. Further, at a boundary between the segments of color wheel 7, where spoke time (time not used for image output) is included, deterioration of image quality can be made less visible by setting a time point for polarity inversion close to the segment boundary.

In the above-described embodiment, the description is made of a case where the area ratio of segment R of color wheel 7 is the largest. The area ratio of each segment only has to be optimally selected as appropriate according to such as the type of a discharge lamp used.

Figure 4:
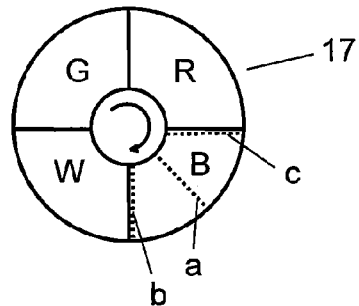
FIG. 4 schematically shows another configuration of a typical color wheel.

Next, a description is made of another case of the embodiment using FIGS. 4 and 5A, 5B, 5C. FIG. 4 schematically shows another configuration of a typical color wheel. Color wheel 17 has 4-color segments with their central angles being all 90°. In the above-described embodiment, the amount of light selected in each segment is normalized by changing the ratio of each central angle (area size) of the segments. In this embodiment, meanwhile, normalization is made by changing the light-emission luminance (the value of a current applied to discharge lamp 6) with each central angle of the segments being equal to the other.

Figure 5A:
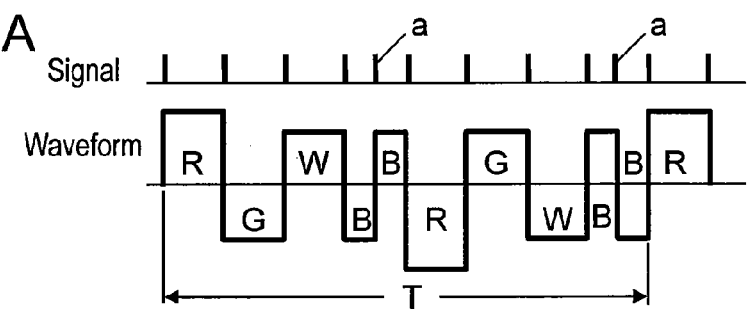
FIG. 5A is a waveform chart of the discharge lamp showing an example of operation of the discharge lamp lighting device according to the embodiment of the present invention.
Figure 5B:
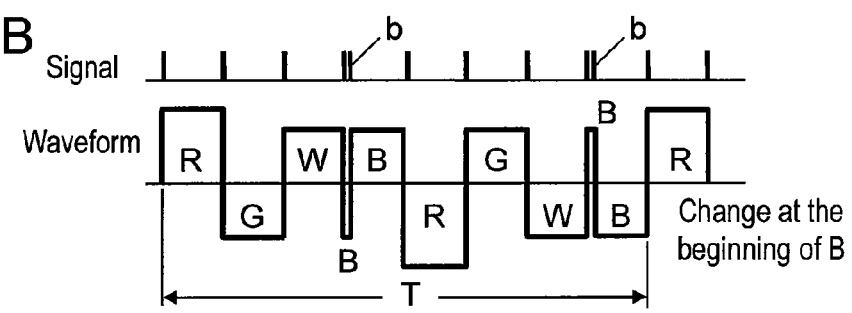
FIG. 5B is a waveform chart of the discharge lamp showing another example of operation of the discharge lamp lighting device according to the embodiment of the present invention.
Figure 5C:
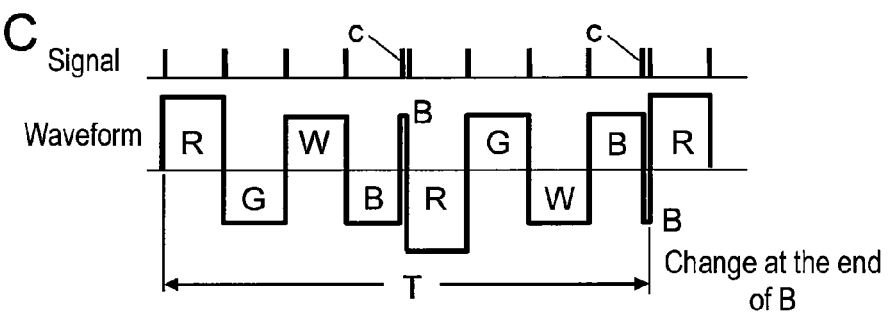
FIG. 5C is a waveform chart of the discharge lamp showing yet another example of operation of the discharge lamp lighting device according to the embodiment of the present invention.

FIGS. 5A through 5C is a waveform chart of the discharge lamp showing operation of the discharge lamp lighting device in a case where color wheel 17 of FIG. 4 is used.

FIGS. 5A, 5B, 5C respectively show relationship between a signal (inversion signal, the upper part of the drawing) and the waveform (the lower part of the drawing) of a current running through discharge lamp 6.

First, a description is made of FIG. 5A. A signal (inversion signal) is generated at each boundary between 4-color segments and also at the intermediate point of segment B (blue). Accordingly, the waveform of a voltage is as the lower part.

The current waveform corresponding to segment R is raised compared to those corresponding to the other segments (a large current value), thereby increasing the luminance of light R. As is clear from FIGS. 5A, 5B, 5C, for the first segment R for instance, the polarity is inverted at the next segment R. The situation is the same for each segment of the other colors.

In other words, the polarity is inverted for each 4-color segment between the first half and the last (the first rotation and the second) of time T during which the color wheel makes two rotations, and thus accumulated time during which a positive voltage is applied to the discharge lamp is equal to that of a negative one. Further, the time product of a positive-direction current is equal to that of a negative one. The time products being equal to each other, the heat load is evenly distributed between both sides of the electrode pair.

Next FIG. 5B shows a case where the position of inversion signal a in FIG. 5A is changed to that of inversion signal b, namely a position close to the segment region W (close to the beginning of segment B). Similarly, next FIG. 5C shows a case where the position of inversion signal a is changed to that of inversion signal c, namely a position close to the segment region R (close to the end of segment B).

As is clear from FIGS. 5B, 5C, the polarity is inverted for each segment between the first rotation and the second one of the color wheel similarly to FIG. 5A in any case. Further, the time product of a positive-direction current is equal to that of a negative-direction current. Thus, the heat load is evenly distributed between both sides of the electrode pair.

As described hereinbefore, according to the discharge lamp lighting device of the embodiment, even when using a color wheel composed of even-numbered color segments, the polarity of the electrode pair of the discharge lamp is inverted in a predetermined segment region, additionally at each boundary between the segments. Herewith, the energy is evenly distributed between both sides of the electrode pair more accurately, thereby extending the life of the discharge lamp and maintaining the quality of a projection image.

In the above-described embodiment, the description is made of an example where color wheel 7 is composed of 4-color segments: R (red), G (green), B (blue), and W (white). However, color wheel 7 may be composed of segments of another color combination or even-number (more than four) colors.

In the above-described embodiment, the description is made of a case where a polarity inversion signal is added once in the segment region of a specific color (blue color) every time color wheel 7 makes one rotation. However, energy has only to be evenly distributed between both sides of the electrode pair, and thus addition of a polarity inversion signal is not limited to once, but may be any odd-number times. For instance, addition may be made once in the blue segment region and twice in the white segment region (three times in total).

In the above-described embodiment, the description is made of a case where a polarity inversion signal is added every time color wheel 7 makes one rotation. However, a rotation period during which a polarity inversion signal is not added may be provided. For instance, a polarity inversion signal may be added once in the segment region of a specific color (blue) every time color wheel 7 makes two rotations.

In the above-described embodiment, the description is made of a case where one discharge lamp is incorporated in a DLP projector (one-lamp type). However, the present invention is applicable to other types with more discharge lamps used (e.g. two-lamp type, four-lamp type).

The invention claimed is:

1. A discharge lamp lighting device of a projector generating a projection image by using a color wheel having even-numbered color segments rotating in an optical path of white light emitted from a discharge lamp to produce transmitted light of even-number colors in a time-divided manner and to illuminate an image display element with the transmitted light, the discharge lamp lighting device comprising:

a polarity inversion signal generating unit generating a polarity inversion signal for changing a polarity of a voltage applied to the discharge lamp; and a lamp polarity changing unit changing the polarity of the voltage applied to the discharge lamp on a basis of the polarity inversion signal, wherein the polarity inversion signal generating unit generates the polarity inversion signal at a boundary between each of the even-numbered color segments, and generates an additional polarity inversion signal in a segment region corresponding to at least one specific color among the even-number colors, such that a polarity of each of the even-numbered color segments in a current rotation period is inverted in a next rotation period, wherein the additional polarity inversion signal is:
a) generated at an adjustable position within at least one of the even-numbered color segments, and
b) generated an odd integer number of times in each of the current rotation period and the next rotation period.

2. The discharge lamp lighting device of claim 1, wherein the additional polarity inversion signal is generated at a time point close to a beginning or an end in a segment region corresponding to the specific color.

3. The discharge lamp lighting device of claim 2, wherein the even-number colors are four colors of red, blue, green, and white, and the specific color is blue.

4. A projector generating a projection image by using a color wheel having even-numbered color segments rotating in an optical path of white light emitted from a discharge lamp to produce transmitted light of even-number colors in a time-divided manner and to illuminate an image display element with the transmitted light, the projector comprising:
the discharge lamp lighting device described in claim 2.

5. The discharge lamp lighting device of claim 1, wherein the even-number colors are four colors of red, blue, green, and white, and the specific color is blue.

6. A projector generating a projection image by using a color wheel having even-numbered color segments rotating in an optical path of white light emitted from a discharge lamp to produce transmitted light of even-number colors in a time-divided manner and to illuminate an image display element with the transmitted light, the projector comprising:
the discharge lamp lighting device described in claim 5.

7. A projector generating a projection image by using a color wheel having even-numbered color segments rotating in an optical path of white light emitted from a discharge lamp to produce transmitted light of even-number colors in a time-divided manner and to illuminate an image display element with the transmitted light, the projector comprising:
the discharge lamp lighting device described in claim 1.

8. A discharge lamp lighting device of a projector generating a projection image by using a color wheel having even-numbered color segments rotating in an optical path of white light emitted from a discharge lamp to produce transmitted light of even-number colors in a time-divided manner and to illuminate an image display element with the transmitted light, the discharge lamp lighting device comprising:
a polarity inversion signal generating unit generating a polarity inversion signal changing polarity of a voltage applied to the discharge lamp; and
a lamp polarity changing unit changing polarity of the voltage applied to the discharge lamp on a basis of the polarity inversion signal, wherein the polarity inversion signal generating unit generates the polarity inversion signal at a boundary between each of the even-numbered color segments, and generates an additional polarity inversion signal in a segment region corresponding to at least one specific color among the even-number colors, such that a polarity of each of the even-numbered color segments in a current rotation period is inverted in a next rotation period, wherein the additional polarity inversion signal is:
a) generated at an adjustable position within at least one of the even-numbered color segments, and
b) generated an odd integer number of times in each of a predetermined rotation period.

* * * * *